June 18, 1963　　　　N. E. HANDEL　　　　3,094,622
DENSITY MEASURING APPARATUS PROVIDING A SUBSTANTIALLY
PURE BEAM OF RADIATION FROM COMPOSITE SOURCES
Filed June 30, 1959

Inventor
Neil E. Handel
By Anthony V. Cennamo

United States Patent Office 3,094,622
Patented June 18, 1963

3,094,622
DENSITY MEASURING APPARATUS PROVIDING A SUBSTANTIALLY PURE BEAM OF RADIATION FROM COMPOSITE SOURCES
Neil E. Handel, Columbus, Ohio, assignor to Industrial Nucleonics Corporation, a corporation of Ohio
Filed June 30, 1959, Ser. No. 824,107
1 Claim. (Cl. 250—83.3)

This invention relates to radiation sources and, more particularly, to a novel method and means for producing a substantially pure beam of electromagnetic radiation from composite radiations resulting from the nuclear disintegration of various radioisotopes.

The apparatus of the present invention may be advantageously utilized in numerous applications dealing with radiation, but for purposes of apt illustration the same is described in conjunction with a thickness measuring gauge wherein the novel results produced are readily evident.

Previous attempts have been made to measure the thickness of materials with non-contacting gauges through the agency of corpuscular and electromagnetic radiations. Gauges of this type measure the thickness of a material in accordance with its ability to absorb energy from a beam of these radiations. Given a material of uniform composition and density interposed in the beam, the attenuation thereof will be a function of the thickness of the material. The character and energy of the radiation used determine the type and the thickness range of materials which can be measured. While radiations such as alpha and beta particles are suitable for thickness measurement of relatively light-weight materials having a mass cross-section extending up to 1000 mg./cm.$^2$, they do not have sufficient penetrating power to allow measurement of heavy materials such as steel plate. Electromagnetic radiation such as X-rays and gamma rays are much more suitable for these materials. But, many times, a gauge utilizing these radiations is not sensitive to slight changes in the weight of materials in an intermediate weight range. In addition, due to their instability of operation, X-ray thickness gauges are not suitable for many industrial applications.

Within recent years, thickness gauges utilizing bremsstrahlung radiation have been built to measure the thickness of materials in the light and intermediate weight range. By directing a beam of beta particles toward a target, a soft X-radiation is produced. This bremsstrahlung radiation is then directed toward a material to be measured and a detector is employed to determine the amount of radiation absorbed by the measured material.

Bremsstrahlung is usually defined as the secondary photon radiation produced by the deceleration of charged particles passing through matter.

Due to their ready availability and stability, certain isotopes are being employed as a convenient source of the incident beta particles necessary for bremsstrahlung generation. Although there are a large number of these isotopes commercially available, it is oftentimes difficult to choose one to fit a particular application. With a given target, the energy of the bremsstrahlung radiation depends on the energy of the originating betas. Accordingly, the bremsstrahlung radiation produced by a strontium 90 source may be of relatively high energy. This radioisotope would be unsuitable for measuring materials in the light and intermediate weight range. Thallium 204 is a convenient source of low energy beta, but it has an extremely shoft half-life. Krypton 85, antimony 125 and cesium 137 emit low energy beta and have useful half-lives, but there is always a slight amount of gamma and other forms of radiation being simultaneously emitted from these isotopes. The presence of these accompanying electromagnetic radiations, particularly the gamma, has a deleterious effect on the thickness measurements of relatively light-weight material. Since the detectors commonly employed in applications of this nature normally respond to gamma radiation as well as the bremsstrahlung, and, since the highly penetrative gamma is not absorbed to any extent by the measured material, spurious responses are induced in the detector which tend to mask or obscure the measurement indications.

These difficulties and other disadvantages of prior art apparatus are overcome by the present invention which teaches the use of a relatively thin target positioned in the path of radiations produced by a radioisotope whereby gamma radiations are transmitted through the target while the incident beta particles generate bremsstrahlung which issues in all directions from the target. By positioning a radiation detector to one side of the target, it is possible to intercept a useful beam of bremsstrahlung not contaminated by gamma radiations.

Accordingly, it is a primary object of the present invention to provide a source of substantially pure bremsstrahlung radiation.

It is another object of the present invention to provide a source of bremsstrahlung radiation which enables more sensitive thickness measurements of materials in the light and intermediate weight range than similar devices used heretofore.

It is also another object of the present invention to provide a source of bremsstrahlung radiation which can be readily adapted to replace existing sources in industrial applications of various types.

It is yet another object of the present invention to provide a source of bremsstrahlung radiation which effectively eliminates deleterious gamma radiations normally prevalent in prior art devices of a similar nature.

It is an additional object of the present invention to provide a source of bremsstrahlung radiation which is simple to construct, inexpensive to manufacture, and economical to maintain.

Other objects and features of the present invention will become evident from the following description when taken in conjunction with the accompanying drawings, in which.

Figure 1:
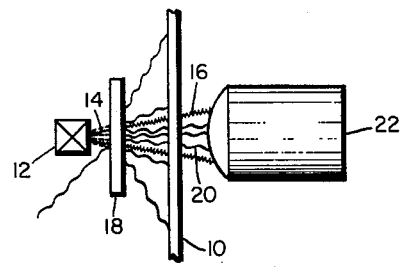
FIG. 1 is a simplified view of the usual method of bremsstrahlung generation.

Referring now to the drawings and specifically to FIG. 1, there is shown a portion of a typical apparatus for detecting certain physical properties of a material 10. A source of radiation 12 is positioned to direct a beam of radiation toward one side of the material 10. Source 12 may be a radioisotope capable of emitting a quantity of beta particles 14 such as indicated by dotted lines. Even though the radioisotope chosen for the application may be principally a beta emitter, a small percentage of the total radiation produced can be attributed to radiations of an electromagnetic nature. In the natural disintegration of the radioisotope 12, a certain number of highly penetrative gamma rays are produced; these are indicated by the curvilinear lines 16. It was found that by interposing a target 18 between the source 12 and the material 10 a useful beam of electromagnetic radiation (bremsstrahlung) was produced. This radiation is also illustrated as curvilinear lines emanating from the target 18 and denoted by the reference numeral 20. Due to its much greater penetrating power than the beta 14, this converted radiation was directed at the material 10 for purposes of analyzing the same for a particular physical property such as thickness.

To detect radiation transmitted by the material 10, an ionization chamber 22 was placed adjacent the opposite side of material 10 in alignment with the source 12 and target 18. Chamber 22 was operative to generate an electrical signal in accordance with the intensity of radiations transmitted by material 10. The detector response was due largely to the bremsstrahlung radiations 20, but a significant portion of the response was induced by the gamma rays 16 which were only negligibly attenuated in traversing the measured material.

As a typical example, the source 12 may comprise a sealed capsule of krypton 85, which is an excellent source of low energy beta particles (0.7 mev.). But, krypton 85 also emits about two-thirds of one percent gamma (0.5 mev.). The target 18 may be fabricated of aluminum. If the emissions of the radioisotope are allowed to impinge upon the target 18, bremsstrahlung radiation is produced. As the efficiency of the conversion is of the order of one percent, it may be observed that the intensity of the generated bremsstrahlung and the original gamma are substantially of the same order of magnitude. In a thickness gauge, the presence of the gamma radiations 16 creates an inferior source of radiation because these radiations pass unattenuated through the measured material and thus contribute nothing to the thickness-functional response of the detector. However, if the two radiations could be separated in such a way as to greatly improve the ratio of bremsstrahlung to gamma radiation, a useful instrument would result.

Figure 2:
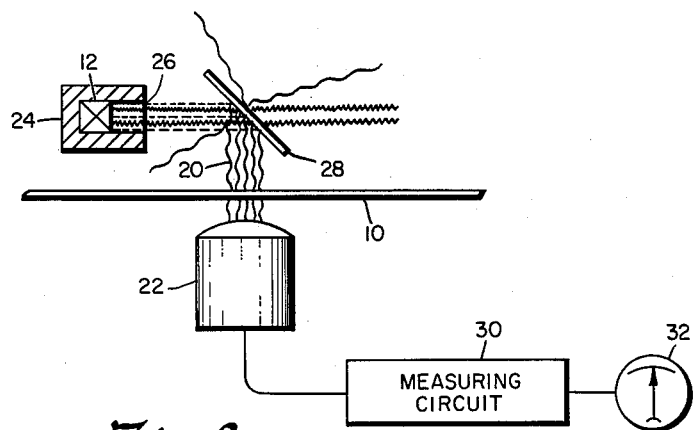
FIG. 2 is a simplified view somewhat diagrammatic of a preferred source of bremsstrahlung radiation showing improvements as taught by the present invention.

Referring to FIG. 2, the present invention teaches a method and means whereby this object may be accomplished. The source 12 is enclosed by a block of radiation shielding material 24 except for a single radiation aperture 26. In alignment with the radiation aperture 26, there is positioned a target 28. The target 28 is preferably inclined with respect to the collimated beam of radiation issuing from the source 12. The target 28 is constructed of sufficient length and width to intercept substantially all of the radiation from the source 12.

The thickness of the target 28 has a significant influence on the operation of the present invention. As the thickness of the target is increased, more of the originating betas 14 are absorbed, and consequently, there is an increase in the amount of generated bremsstrahlung 20. When 90% of the betas are absorbed further increases in target thickness produce very little change in bremsstrahlung output. However, the scattering of the gamma 16 by the target 28 is directly proportional to its thickness, and scattered gamma radiation mingles with the beam of bremsstrahlung radiation 20. The thickness of the target must be carefully chosen to provide enough bremsstrahlung for a given application and at the same time permit no more than a minimal portion of the gamma to be scattered.

As a typical example, the aluminum target 28 may be constructed of a thickness approaching .050 inch. In this case, 98% of the betas and only 2% of the gammas are absorbed by the target. The resulting bremsstrahlung is sufficient for most applications, and the small amount of scattered gamma can be tolerated. It may be desirable to further reduce the thickness of the target 28 to decrease the amount of scattered gamma, but it may be necessary to increase the activity of the source 12 to obtain enough bremsstrahlung. The task of shielding the source to comply with health safety regulations becomes more of a problem.

Due to the relatively thin target 28, the objectionable gamma rays easily continue through the target 28 while a substantial portion of the generated bremsstrahlung is emitted from the surface of the target. Then by positioning the measured material 10 and chamber 22 to one side of the incident beam to utilize the emitted bremsstrahlung, it is apparent that the highly penetrative gamma rays cannot influence the response of the chamber 22. In accordance wtih well-known techniques, the useful beam of generated bremsstrahlung is emitted substantially orthogonal with respect to the incident radiation beam of charged particles. It should be apparent that the target 28 may be inclined at angles to said incident beam other than that shown, without relinquishing any of the advantages associated with the present invention.

By coupling a measuring circuit 30 and a suitably calibrated indicator 32 to the ionization chamber 20, the response of the chamber may be translated to thickness values of the material 10. Reference may be had to U.S. Letters Patent No. 2,790,945, issued April 30, 1957, to H. R. Chope, for details of a measuring system which may be advantageously employed herein.

Figure 3:
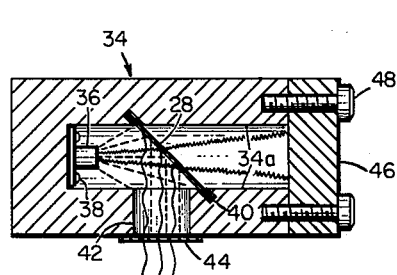
FIG. 3 is a detailed sectional view of a novel bremsstrahlung source employing the principles shown in FIG. 2.
Figure 4:
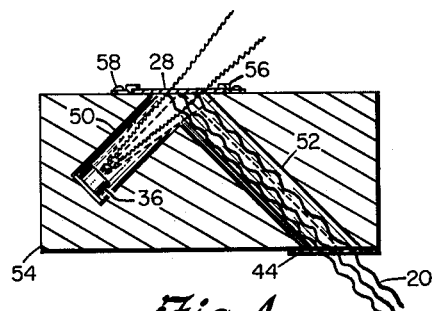
FIG. 4 is a sectional view of a modification of the source shown in FIG. 3.

The following FIGS. 3 and 4 serve to illustrate various expedients for mounting the source 12 and target 28.

Referring first to FIG. 3, a generally rectangular housing 34 contains a cavity 34a bored longitudinally therein. Housing 34 may be preferably fabricated of lead or other radiation shielding material. At the bottom of cavity 34a, a source capsule 36 containing a quantity of a radioisotope is bolted as at 38. A slot 40 is milled in the housing 34 transverse to the longitudinal axis of the cavity 34a to accommodate the target 28. Slot 40 should extend only partially through the housing 34 to centrally position the target 28 over the cavity 34a. Those skilled in the mechanical art may readily devise a retaining plug for maintaining the target in slot 40, accordingly, such an expedient is not illustrated herein. In addition, it may be desirable to have a number of targets of different composition on hand to be inserted in the slot 40 for producing bremsstrahlung radiations of various average energies.

A passage 42 is drilled in the housing 34 perpendicular to the axis of cavity 34a. Passage 42 extends toward the forwardly slanting surface of the target 28. Inasmuch as there will also be a certain amount of beta reflection from the surface of target 28, it may be desirable to fasten a thin window 44 of stainless steel over the passage 42 to effectively eliminate beta particles from the useful beam of bremsstrahlung 20 issuing from the target 28. The objectionable gamma radiation as well as a portion of the generated bremsstrahlung which radiate rearwardly of the target 28 are absorbed by a cap 46 secured over the cavity 34a by a pair of bolts 48.

In the configuration of FIG. 4, a pair of holes 50 and 52 are drilled in a block 54 to describe a V having its point terminating in a generally flat surface of the block 54. One leg 50 of the V-cut hole is shorter than the other and contains the source capsule 36. The other leg 52 of the V-cut hole extends through the block 54 and is covered by the beta-absorbing window 44. Target 28 may be then conveniently fastened by a pair of clamps 56 secured by screws 58 over the aperture defined by the intersection of the V-cut holes on the face of block 54.

While the present invention has been shown and described in conjunction with a preferred embodiment, said showing and illustration should be regarded merely as an example of only one of numerous forms the present invention may assume. Since many changes, additions and omissions may be made in the foregoing disclosed apparatus without departing from the original spirit or scope of the present invention or sacrificing any of its attendant advantages; for purposes of differentiation, the same is defined and limited only by the structure recited in the succeeding claim.

I claim:

Apparatus for measuring a property of material utilizing bremsstrahlung of a desired energy effective for the range of the property being mesured, said apparatus comprising a radioactive source emitting beta rays capable of producing bremsstrahlung of the desired energy and also emitting a substantial number of gamma rays of energy greater than said desired energy, a target disposed in the path of beta rays and gamma rays emitted by said source in which target a portion of beta rays emitted by said source undergo radiative collisions with the nuclei of said target to produce bremsstrahlung, said target having a thickness sufficient to absorb a substantial portion of said beta rays while passing substantially all of the gamma rays of energy greater than said desired energy, utilization means responsive to bremsstrahlung disposed in the path of bremsstrahlung produced in said target by said beta rays and out of the path of gamma radiation from said source transmitted through said target, said utilization means including a detector sensitive to bremsstrahlung for producing a signal indicative of said property, and means for shielding said detector from radiations coming directly from said source.

References Cited in the file of this patent

UNITED STATES PATENTS

| | | |
|---|---|---|
| 2,629,831 | Atchley | Feb. 24, 1953 |
| 2,884,538 | Swift | Apr. 28, 1959 |
| 2,937,275 | Thourson et al. | May 17, 1960 |
| 2,963,585 | Beeh | Dec. 6, 1960 |

OTHER REFERENCES

Beta-Ray Excited Low Energy X-Ray Sources, by Reiffel, Nucleonics, Vol. 13, No. 3, March 1955, pages 22 to 24.

Beta-Ray Excited X-Ray Sources, by Reiffel et al., International Conference on Peaceful Uses of Aatomic Energy, The United Nations Press, 1955, Vol. 15, pages 291 to 294.